United States Patent [19]

Spinner

[11] Patent Number: 5,143,471
[45] Date of Patent: Sep. 1, 1992

[54] TUBULAR REINFORCEMENT ELEMENT AND METHOD OF MAKING SAME

[76] Inventor: Samuel Spinner, 8 Dov Hoz, Rishon LeZion, Israel

[21] Appl. No.: 523,523

[22] Filed: May 15, 1990

Related U.S. Application Data

[63] Continuation-in-part of Ser. No. 424,786, Oct. 20, 1989, abandoned.

[51] Int. Cl.[5] .................. F16B 11/00; B62K 19/22
[52] U.S. Cl. .................................. 403/190; 403/246; 403/272; 280/281.1
[58] Field of Search ............... 403/245, 246, 189–192, 403/187, 289, 234, 233, 237, 272, 274, 198, 199, 230; 228/138; 29/525; 72/348, 379.2; 280/281.1, 279

[56] References Cited

U.S. PATENT DOCUMENTS

| | | | |
|---|---|---|---|
| 582,138 | 5/1897 | Hedenberg et al. | 403/246 X |
| 2,080,698 | 5/1937 | Clark | 280/281.1 |
| 2,091,982 | 9/1937 | Hart | 280/281.1 X |
| 2,380,497 | 7/1945 | Bound | 403/272 X |
| 2,387,154 | 10/1945 | Kalwitz | 403/272 X |
| 2,491,379 | 12/1949 | Kraeft et al. | 403/272 X |
| 2,941,855 | 6/1960 | Weill | 403/237 |
| 3,598,433 | 8/1971 | Sarickas | 403/190 |
| 3,850,534 | 11/1974 | O'Halloran | 403/190 |
| 4,150,907 | 4/1979 | Thurnauer | 403/234 |
| 4,565,383 | 1/1986 | Isaac | 403/272 X |
| 4,598,922 | 7/1986 | Kleinebenne et al. | 280/281.1 X |

FOREIGN PATENT DOCUMENTS

| | | | |
|---|---|---|---|
| 0220989 | 9/1990 | Japan | 280/281.1 |
| 13100 | 7/1893 | United Kingdom | 403/272 |
| 11357 | 7/1900 | United Kingdom | 403/272 |

*Primary Examiner*—Peter M. Cuomo
*Attorney, Agent, or Firm*—Browdy and Neimark

[57] ABSTRACT

A tubular reinforcement element between two hollow tubular members includes an internal lug located internally of the open end of the one hollow tubular member. The internal lug includes a slotted side wall of the same configuration as, and bonded to the inner face of, the open end of one hollow tubular member, and a concave end wall integrally formed with the side wall and extending across the open end of the one hollow tubular member. The end wall of the internal lug has a concave surface complementary and bonded to the curved external surface of the second tubular member.

15 Claims, 1 Drawing Sheet

TUBULAR REINFORCEMENT ELEMENT AND METHOD OF MAKING SAME

This is a continuation-in-part of parent co-pending application Ser. No. 07/424,786, filed Oct. 20, 1989, now abandoned without prejudice in favor of the present application.

BACKGROUND OF THE INVENTION

The present invention relates to a tubular reinforcement element between a hollow tubular member and another member, and also to a method of making such tubular elements. The invention is particularly applicable for reinforcing the connection of two hollow tubular members, such as in constructing the tubular frame of a bicycle, and is therefore described below with respect to this application, but it will be appreciated that the invention could advantageously be used in many other applications as well.

A common technique for joining together two hollow tubular members, such as in the construction of bicycle frames, is to use an external lug which includes a sleeve enclosing and bonded to the outer surface of one tubular member and formed with a peripheral flange bonded to the outer of the other tubular member. The bonding of the external lug may be effected by welding or by brazing. While such a tubular joint construction provides relatively high mechanical strength, it is visible and may therefore detract from its external appearance. Moreover, it is expensive to produce.

German Patent 94,366 describes a method of connecting two tubular sections of bicycle frames. The reinforcement member is an investment casting which is expensive to manufacture.

U.K. Patent 421,687 relates to seat lugs for cycles, which are a standard common fully symmetrical draw cup with a flat bottom with or without the optional tabs which are obtained by cutting slots in the side wall of said lug.

OBJECTS AND BRIEF SUMMARY OF THE INVENTION

An object of the present invention is to provide a tubular reinforcement element between a hollow tubular member and another tubular member, and also a method of making such a reinforcement element, having advantages in the above respects. Another object of the present invention is to provide a reinforcement element, and method of making same, particularly applicable in the construction of bicycle frames.

It is a further object of the present invention to provide a reinforcement element made of a stamped blank by a single double action formed operation.

According to the present invention, there is provided a tubular reinforcement element made of stamped blank between a hollow tubular member having an open end and another tubular member, said tubular element comprising an axially four slotted cylindrical section extending from a concave end wall. Such a construction facilitates producing the reinforcement element by a single stage, double action deep-drawing like process It also increases the lengths of the edges of the internal lug, where joined to the two members, for the formation of fillets of the brazing material, thereby further enhancing the mechanical strength of the tubular joint.

According to further features in the preferred embodiment of the invention described below, the other member has a curved external appearance, and the end wall of the internal reinforcement member has an outer curved surface complementary to the curved external surface of the other member. The internal lug is jointed to the hollow tubular member and other member by brazing.

According to further features in the described embodiment, the hollow tubular member is joined at an oblique angle to the other member, e.g., another hollow tubular member, as when constructing a bicycle frame. In such a case, the open end of the hollow tubular member receiving the reinforcement element is initially cut at a bias corresponding to the oblique angle, and the end wall of the said reinforcement element is integrally formed with it side wall at the same oblique angle.

Tubular reinforcement element constructed in accordance with the above features exhibit a very high degree of mechanical strength because the increased contact surface area provided by the said element for joining the two members together. In addition, since the element is internal, it is hidden from view, and therefore provides a neat, unbroken appearance.

According to another aspect of the invention, there is provided a method of making a tubular reinforcement element from a stamped flat blank being forced through a drawing die to assume the required configuration.

In one described embodiment, the reinforcement element is simultaneously joined to both the hollow tubular member and the other member by brazing after the said element has been inserted into the open end of the hollow tubular member. In a second described embodiment, after said element has been inserted into the open end of the hollow tubular member, the side wall of said element is first joined to the hollow tubular member by brazing. Then the hollow tubular member is placed against the other member, and the end wall of the reinforcement element is bonded to the other member by brazing.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 3:
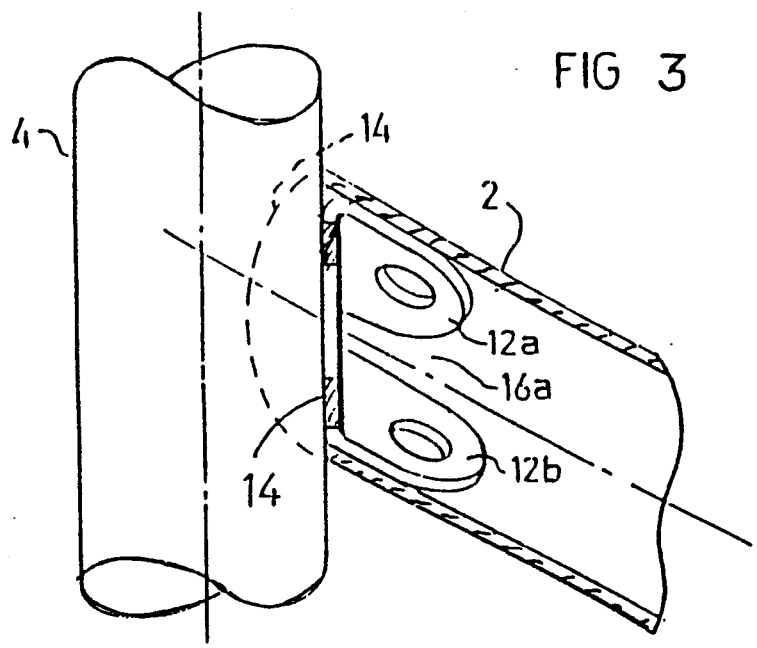
FIG. 3 is a side elevational view, partly in section, illustrating one form of tubular joint constructed in utilising the reinforcement element according to the present invention.

The reinforcement element illustrated in the drawings is particularly useful for joining together two tubular members, 2 and 4, for example, in the construction of a bicycle frame. As illustrated in FIG. 3, tubular member 2 is joined at its open end to the outer face of tubular member 4 at an oblique angle.

According to the present invention, tubular member 2 is joined to tubular member 4 by the use of a further member, hereinafter called reinforcement element and generally designated 10, to distinguish from the external lug commonly used in constructing bicycle frames and other similar devices.

In the tubular joint produced with the use of the reinforcement element 10, such element 10 is located internally of the open end of tubular member 2. It includes a side wall 12 of the same configuration as, and bonded to the inner face of, the open end of tubular member 2 and an end wall 14 integrally formed with, and extending across, side wall 12. End wall 14 is substantially flush with the open end of tubular member 2 and is bonded to the outer face of tubular member 4.

Figure 1:
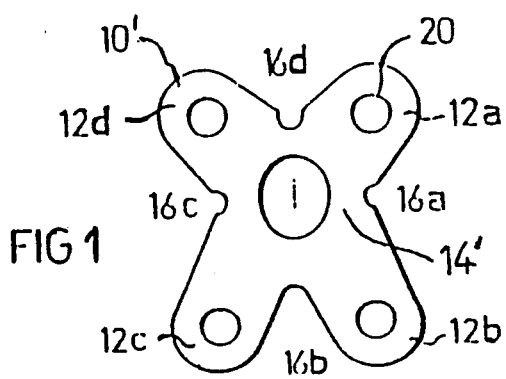
FIG. 1 is a plan view illustrating the reinforcement element used in the tubular joint of FIGS. 3 and 4 when in its initial flat condition, showing the sectorial relieving.
Figure 2:
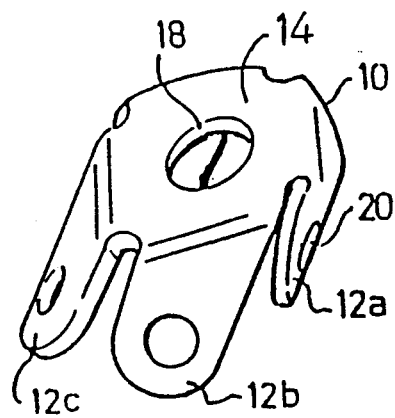
FIG. 2 illustrates the reinforcement element of FIG. 1 in its drawn condition before insertion into the open end of one of the tubular members.

The construction of reinforcement element 10, and one method of making it (by a deep-drawing like process) are more particularly illustrated in FIGS. 1 and 2. When the reinforcement element 10 is made by a deep-drawing like process, a flat blank 10' of the required configuration is first stamped from a flat sheet metal as shown in FIG. 1. The flat blank 10' is then form-drawn in a single operation using a double action drawing tool-die, assuming the configuration illustrated in FIG. 2.

Figure 4:
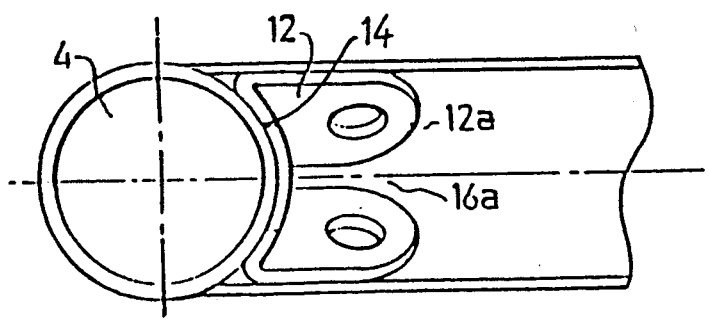
FIG. 4 is a top elevational view illustrating the tubular joint of FIG. 3.

The flat blank illustrated in FIG. 1, includes a central formation 14' which, in the drawn form of the element as illustrated in FIG. 2, defines the end wall 14 of the element. The element 10 comprises a properly angled concave surface integral with a four slotted cylinder section, as illustrated in FIG. 2. Not only must the end wall 14 be properly angled, but in order to complement and interfit with the cylindrical exterior of the tubular member 4, it will be understood that the concavity is a radially extending cylindrical concavity as best seen in FIGS. 3 and 4.

Blank 10' is further formed with a central hole 18 through formation 14', and with a further optional hole 20 through each of the tabs 12a'-12d'. Hole 18 thus appears in the center of the end wall 14 in the drawn condition of the internal element illustrated in FIG. 2, while holes 20 appear through the tabs 12a-12d defining the element side wall. The center hole 18 is preferably of non-circular configuration, e.g., square configuration, as it may be used for locating in the drawing tool when the element is formed by the drawing process. Optional holes 20 through the tabs 12a-12d are shown as being of circular configuration, but they too may also be non-circular. These holes are a stress distribution in assembly feature.

During the drawing process, the tabs 12a'-12d' are bent out of the plane of the center formation 14', so as to produce the four slotted cylindrical section.

After the reinforcement element 10 illustrated in FIG. 2 has been formed as described above, it is inserted into the open end of tubular member 2, with the end wall 14 substantially flush with, and extending across, the open end of the tubular member. Tubular member 2 with its internal lug 10 is then placed firmly against the outer face of tubular member 4, and the whole assembly is then brazed by a conventional brazing process.

Alternatively, the brazing may be in a two-step procedure, wherein element 10 is first brazed to tubular member 2, and then is brazed to the outer face of tubular member 4.

The blank 10' is dimensioned so that, in its drawn form as illustrated in FIG. 2, the outer faces of the tabs 12a-12d defining the side wall 12 firmly engage the inner face of tubular member 2 so as to retain the element in place until bonded by the subsequent brazing operation.

It will thus be seen that the illustrated joint will exhibit a high degree of mechanical strength because of the increased contact surface provided by the reinforcement element 10 for joining together the two tubular members 2, 4. Also, since the reinforcement element 10 is hidden from view, the tubular joint presents a neat, unbroken appearance.

Relieving by four bend oriented slots provides a further important advantage. It facilitates the drawing of the blank into the form of the internal lug illustrated in FIG. 2, by a single stroke dual stage drawing operation.

While the reinforcement element 10 is described above as having been made by a deep-drawing like process, it will be appreciated that it could be made by other processes, for example an investment casting process or a conventional multi stage deep-drawing process. The reinforcement element may also be used in other applications than joining two tubular members together for producing a bicycle frame.

Further variations, modifications and applications of the invention will be apparent.

I claim:

1. A tubular joint internal reinforcement element between two tubular members, said element comprising,
    an axially four-slotted cylindrical section integral with and extending outwardly from a coextensive concave end wall,
    said axially four-slotted cylindrical section defining four axially extending tabs,
    a first end of each of said four axially extending tabs integrally joined on a peripheral edge of said coextensive concave end wall,
    said peripheral edge of said coextensive concave end wall being defined by said first end of each of said four axially extending tabs,
    wherein said element is formed from a flat stamped sheet metal blank by a single stage double action drawing process.

2. A tubular joint internal reinforcement element as claimed in claim 1, wherein said blank comprises four sectional relieves two relieves arranged in a symmetrical form along its longitudinal axis while the other two along its transversal axis.

3. A tubular joint internal reinforcement element as claimed in claim 2, wherein said flat blank comprises four tabs, two of which are on the longitudinal axis of symmetry line while the other two are on the transversal line.

4. A tubular joint internal reinforcement element as claimed in claim 1, wherein said element is joined to said hollow tubular members by brazing.

5. A tubular joint internal reinforcement element as claimed in claim 1, wherein said end wall is formed with a central hole.

6. A tubular joint internal reinforcement element as claimed in claim 5, wherein said flat stamped blank is made with a central non round locating and polarizing tooling hole.

7. A tubular joint internal reinforcement element as claimed in claim 1; wherein said blank is made with stress distributing holes at an end of each of said sectorial relieves where said sectorial relieves are integrally joined to a center formation of said blank.

8. A tubular brazed joint reinforcement element as claimed in claim 1, wherein said tabs are formed with stress relieving holes at a juncture of each said tab with said concave end wall.

9. A tubular joint internal reinforcement element as claimed in claim 1, wherein said blank is adapted to form a variety of angled reinforceing elements and tube diameters to be used for the construction of bicycle frames.

10. An internal reinforcement element for butt joining an end of a first tubular member to an exterior surface of a second tubular member, said internal reinforcement element being formed from a flat sheet metal blank having a plurality of lobes extending outwardly therefrom, said element having a longitudinal axis and an end wall, said end wall defining a form-drawn and generally radially extending cylindrical concavity, and a form-drawn axially slotted cylindrical sidewall section integral with said end wall, said cylindrical side wall comprising a plurality of sections formed from said lobes, a first end of each of said plurality of sections integrally joined on a peripheral edge of said end wall,
wherein said peripheral edge of said end wall is defined by said first end of each of said plurality of sections.

11. An internal reinforcement element according to claim 10 wherein said generally radially extending cylindrical concavity has an axis perpendicular to said longitudinal axis, and wherein said cylindrical sidewall comprises at least two of said sections (12d-12c and 12a-12b) separated by slots (16b and 16d) which intersect said generally radially extending cylindrical concavity.

12. An internal reinforcement element according to claim 10 wherein said cylindrical sidewall comprises four of said sections formed from said lobes.

13. An internal reinforcing element according to claim 10 wherein said generally radially extending cylindrical concavity has an axis which intersects said longitudinal axis at an angle inclined from 90° whereby at one end of said generally radially extending cylindrical concavity said sidewall is inclined at an obtuse angle from said end wall and at the other end of said generally radially extending cylindrical concavity said sidewall is inclined from said end wall at an acute angle, and wherein said cylindrical sidewall comprises at least three sections formed from said lobes (12c-12b and 12a and 12d).

14. A brazed butt joint between an end of a first tubular member and an exterior surface of a second tubular member, said brazed joint being internally supported by an internal reinforcement element formed from a flat sheet metal blank having a plurality of lobes extending outwardly therefrom, said reinforcement element having a longitudinal axis and an end wall, said end wall defining a form-drawn and generally radially extending cylindrical concavity, and a form-drawn axially slotted cylindrical sidewall section integral with said end wall, said cylindrical side wall comprising a plurality of sections formed from said lobes,
a first end of each of said plurality of sections integrally joined on a peripheral edge of said end wall,
wherein said peripheral edge of said end wall is defined by said first end of each of said plurality of sections.

15. A method of making a joint internal reinforcement element comprising the steps of:
a) stamping a flat blank from a sheet metal plate in a configuration including a central formation having a concave end wall with a central locating tooling hole and a cylindrical section having four axially extending tabs with respective sectorial relieves therebetween, each of said tabs having rounded tips with respective stress distributing holes,
b) placing said blank in a forming apparatus and forcing said blank through a drawing die in a single stroke double action process, a first action forming said concave end wall while a second action being the drawing of the cylindrical section having said four axially extending tabs,
c) release of the joint reinforcement element for the drawing die.

* * * * *